US009442621B2

(12) United States Patent
Hauser

(10) Patent No.: US 9,442,621 B2
(45) Date of Patent: Sep. 13, 2016

(54) SYSTEM, METHOD AND COMPUTER READABLE MEDIUM FOR DETERMINING USER ATTENTION AREA FROM USER INTERFACE EVENTS

(75) Inventor: Robert R. Hauser, Frisco, TX (US)

(73) Assignee: SUBOTI, LLC, Frisco, TX (US)

( * ) Notice: Subject to any disclaimer, the term of this patent is extended or adjusted under 35 U.S.C. 154(b) by 725 days.

(21) Appl. No.: 12/435,761

(22) Filed: May 5, 2009

(65) Prior Publication Data

US 2010/0287013 A1    Nov. 11, 2010

(51) Int. Cl.
G06F 3/048    (2013.01)
G06F 3/0481   (2013.01)
G06F 3/0354   (2013.01)
G06F 17/30    (2006.01)
G06Q 10/06    (2012.01)

(52) U.S. Cl.
CPC ......... *G06F 3/0481* (2013.01); *G06F 3/03543* (2013.01); *G06F 17/30867* (2013.01); *G06Q 10/06375* (2013.01)

(58) Field of Classification Search
None
See application file for complete search history.

(56) References Cited

U.S. PATENT DOCUMENTS

| 6,848,108 | B1 | 1/2005 | Caron |
| 7,051,042 | B2 | 5/2006 | Krishnaprasad et al. |
| 2007/0282825 | A1* | 12/2007 | Toub ............................ 707/5 |
| 2010/0169792 | A1* | 7/2010 | Ascar et al. ................. 715/744 |

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

*Primary Examiner* — Jeffrey A Gaffin
*Assistant Examiner* — Ayesha Huertas Torres

(57) ABSTRACT

During an interaction with a web page, user interface events are recorded and augmented with page layout data from the document object model. An event stream is formed with the page layout data and communicated to an event server. The event server processes the event stream to determine a location at which the events were generated, which can be used to predict an area of a user's attention.

12 Claims, 7 Drawing Sheets and the web page is illustrated in FIG. 2. At step
SYSTEM, METHOD AND COMPUTER READABLE MEDIUM FOR DETERMINING USER ATTENTION AREA FROM USER INTERFACE EVENTS

FIELD OF THE INVENTION

This disclosure relates to a system, method and computer readable medium for processing of user interface events.

BACKGROUND OF THE INVENTION

In many web based applications, it may be beneficial to determine where the attention of a user is focused during an interaction. One existing solution is to use click stream data, it being considered that a user's attention is directed towards the location of the click. However, click stream data is typically course grained and there can be relatively long periods of time between complete mouse click events in which the focus of the user's attention is unknown.

What is required is a system, method and computer readable medium for better determining a locus of attention of a user.

SUMMARY OF THE INVENTION

In one aspect of the disclosure, there is provided a method for predicting an area of focus of a user during an interaction with a web page. The method comprises recording at least one document object model element within a web browser, recording a plurality of user interface events in respect of the at least one element of the document object model, and processing the plurality of user interface events to predict an area of focus of the user.

In one aspect of the disclosure, there is provided a web server configured to generate a web page and provide the web page to a client browser. The web page comprises web page content visible to a user, an event observer module that records user events generated in respect of the webpage content and communicates event stream data to an event server and a layout module that augments the event stream data with page layout data.

In one aspect of the disclosure, there is provided a computer-readable medium comprising computer-executable instructions for execution by a processor, that, when executed, cause the processor to receive an event stream comprising a plurality of events generated during a user interaction with a web page, and process the event stream to determine an area of focus of a user during the user interaction with the web page.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
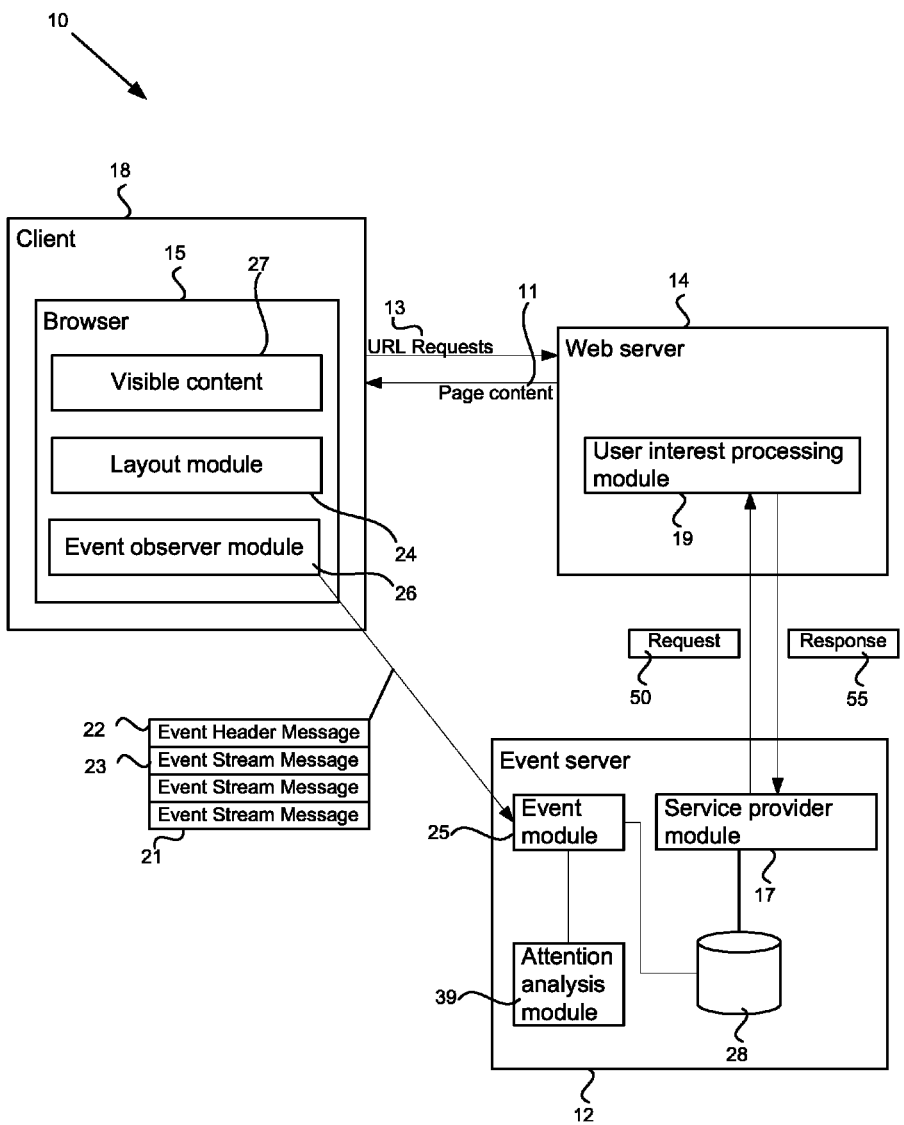
FIG. 1 illustrates a system for determining a user's attention area during a web page interaction.

A system in accordance with an embodiment of the disclosure is depicted in FIG. 1. In the system 10, a client 18 provides web page requests 13 to a web server 14, in response to which, the web server 14 provides page content 11 for display in a browser 15 of the client 18. Typically, the web page 11 will include visible content 27.

In typical webpage protocols, a document object model (DOM) of a webpage structure may include a document, a body and several elements, including elements embedded within each other. A DOM is an example of a hierarchically structured document. Events, in particular user triggered events such as mouse movements, cursor movements, mouse clicks or keyboard events may be generated at various locations on the page. Application code running in the webpage environment may register event handlers on various web page objects. The event handlers may handle events in a variety of ways. A first event handling method is referred to as event capturing. Event capturing provides an event first to the top most object in the web page hierarchical structure, i.e. DOM, and onward in a descending fashion as follows:

DOCUMENT→BODY→ELEMENT→A→ELEMENT B

Event bubbling provides an event first to the bottom most object and onward in an ascending fashion as follows:

ELEMENT B→ELEMENT→BODY→DOCUMENT

Figure 2:
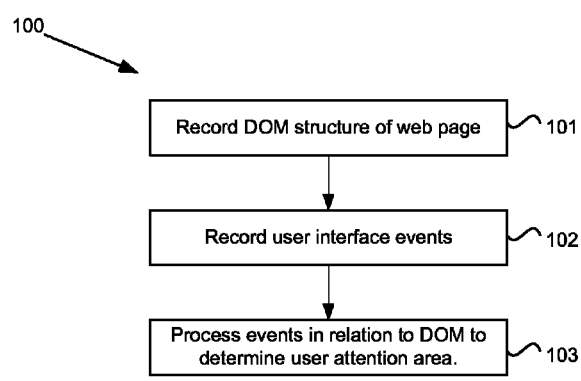
FIG. 2 illustrates a method for predicting a user's focus area.

During an interaction between a user at the client and the web page, it may become desirable to determine a locus of attention of the user. One reason for determining where the user's attention is focused is for the placement of additional content such as advertising or other graphics, text, images, videos etc that are intended to capture the user's attention. A method for predicting an area of focus of a user during an interaction with a web page is illustrated in FIG. 2. At step 101, the structure of the web page DOM is recorded including one or more elements of the DOM. A plurality of user interface events are recorded in respect of the elements of the DOM 102. The events may be mouse moves, partial clicks (i.e. either mouse down or mouse up), text entries, etc. The recorded user interface events are then processed 103 to predict an area of focus of the user.

In accordance with an embodiment of the invention, the web server 14 is modified such that the web page content provided to the client 18 includes an event observer module 26 and layout module 24, both of which may be provided as appropriate code or scripts that run in the background of the client's browser 15. In one embodiment, code for providing the event observer module 26 and the layout module 24 is provided to the web server 14 by a third party service, such as provided from an event server 12, described in greater detail below.

The event observer module 26 and the layout module 24 may be provided as code embedded in a web page 11 from the web server 14. Alternatively or in addition, the event observer module 26 and the layout module 24 may be provided as a link back to the web server 14 or a third party server, e.g. event server 12, for the resource containing the code which the web browser will fetch as part of loading the web page.

The event observer module 26 observes events generated in a user interaction with the web page 11 at the client 18. The event observer module 26 records events generated within the web browser 15, such as mouse clicks, mouse moves, text entries etc., and generates event streams 21 including an event header message 22 and one or more event stream messages 23. It will be apparent to a person skilled in the art that terms used to describe mouse movements are to be considered broadly and to encompass all such cursor manipulation devices and will include a plug-in mouse, on board mouse, touch pad, eye-tracker, etc.

The event observer module 26 provides the event streams 21 to the event server 12. The event server 12 includes an event module 25, an attention analysis module 39 and a suitable data store 28, which though shown in FIG. 1 within the event server 12, may also be provided as an offsite data store. The event server 12 also includes a service provider module 17 which interfaces with a processing module 19 of the web server 14.

Figure 3:
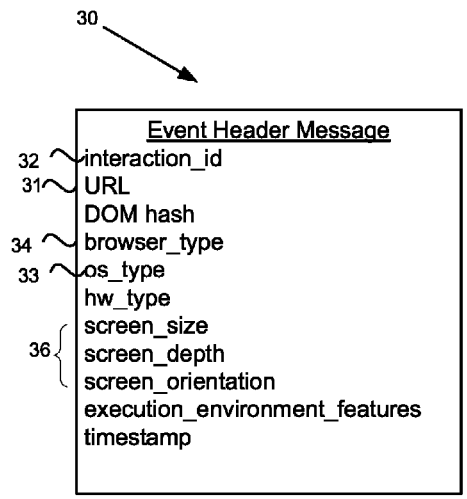
FIG. 3 illustrates an example of an event header message.
Figure 4:
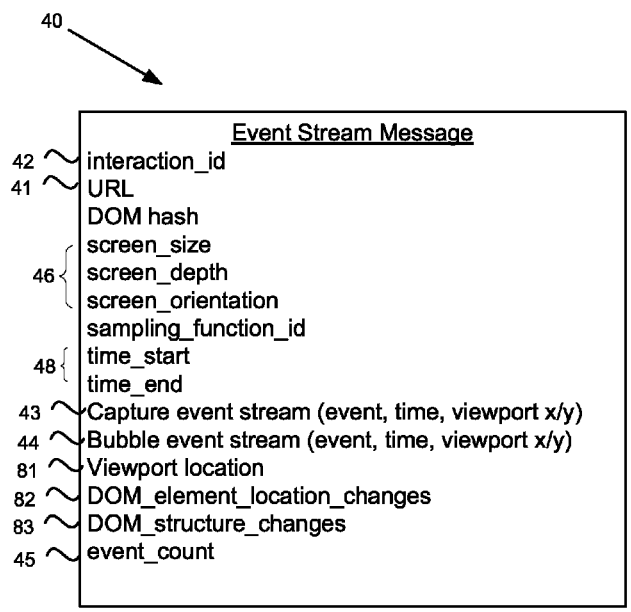
FIG. 4 illustrates an example of an event stream message.

An example of an event header message 30 is illustrated in FIG. 3 and an example of an event stream message 40 is illustrated in FIG. 4. The messages 30, 40 show a number of components that can be included, though in various embodiments, not all of these components may be required and additional components may be added. Primarily, an Interaction_ID 32, 42 uniquely identifies an interaction between the client 18 and the web server 14 and aids to identify the particular event stream 21. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. Not all web browser types support event capture, and thus the capture event stream 43 may be empty. Where required, events missing from the event bubble stream may be inferred, for example as described in the Applicant's co-pending application Attorney Docket No. HAUSER002, the entire contents of which are explicitly incorporated herein by reference. An event_count field 45 may indicate the total number of unique events observed by the event observer module including those events not included in the event stream message 40 due to a current sampling function excluding them. Timing parameters 48 may indicate the relevant period over which the event stream message 40 is current.

The event observer module 26 passes the event streams 21 to the event module 25 of the event server 12. In the embodiment illustrated in FIG. 1, the event streams 21 are provided directly to the event module 25. However, the event streams 21 may also be provided indirectly, e.g. via the web server 14.

The layout module 24 processes the web page content on the client browser 15 and augments the event stream messages 21 with viewport and DOM element layout information. Additional fields of the event stream messages 40 shown in FIG. 4 include a viewport location 81, DOM element location changes 82 and DOM structure changes 83. The DOM element location changes 82 and DOM structure changes 83 may be reported in absolute terms, or may be reported as changes in these parameters since the last report. The viewport location 81 may include a time interval over which the viewport location information can be considered valid.

During an interaction with the web page 11, a user navigates the web page 11 and may enter content where appropriate, such as in the HTML form elements. During this interaction events are generated and recorded by the event observer module 26. Events may include mouse clicks, mouse moves, key strokes etc. Periodically, the event observer module 26 formulates an event stream message 23, at which time, the event module provides a callback to the layout module 24 for layout data to be included in the event stream message.

Figure 5:
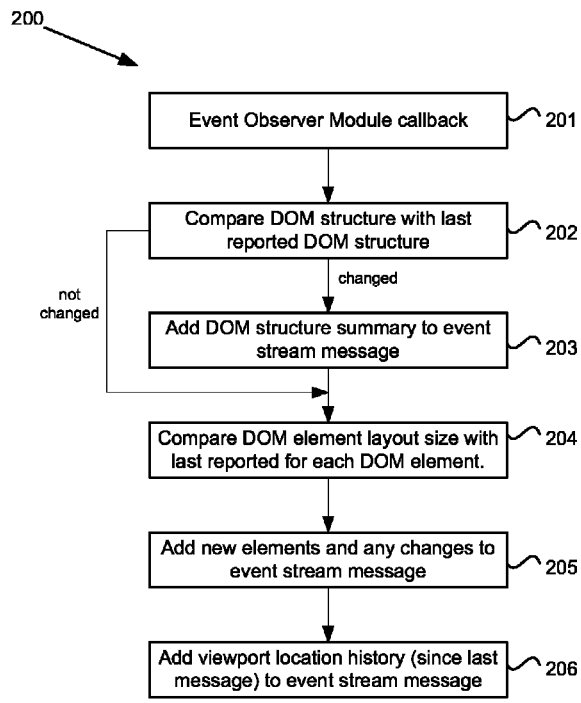
FIG. 5 illustrates an operation of a layout module.

A process 200 performed by the layout module 24 in response to the callback is shown in FIG. 5. The layout module 24 receives the event observer module callback at step 201 and proceeds to compare a current DOM structure of the web page 11 with the last reported DOM structure 202. The layout module 24 may register itself to watch DOM changes or may simply enumerate the structure as needed. If changes are observed, then a DOM structure summary is provided to the event observer module 26 to be added to the event stream message 23 (step 203). At step 204, the DOM element layout size is compared to the last reported layout size for each DOM element. New elements and any changes of the DOM element layout sizes are communicated 205 to the event observer module 26 for inclusion in the event stream message 23. The DOM element layout size can be computed using element properties "offset left" and "offset top" as is known. Alternatively, the events generated by the user, e.g. mousemove etc., can be correlated to the first element to see the event in the event bubbling phase. Since the events have x,y coordinate positions, the action of moving the mouse across a DOM element rendered in the viewport window will allow local recording of the size and location of the respective DOM element. At step 206, the viewport location history is communicated to the event observer module 26 for inclusion in the event stream message 23, after which the event stream message 23 may be communicated to the event server 12.

The event server 12 receives the event stream 21 including the augmented event stream messages 23 and processes the event streams in an event module 25. Events may be extracted from the event stream messages 23 together with the viewport data and communicated to the attention analysis module 39 for additional processing. If the event stream 21 includes a new InteractionID, data storage may be allocated in the data store and an initial DOM structure and element layout information may be recorded. When additional event stream messages are received, any updates to the viewport location, DOM structure and DOM element layout are also stored.

Figure 6:
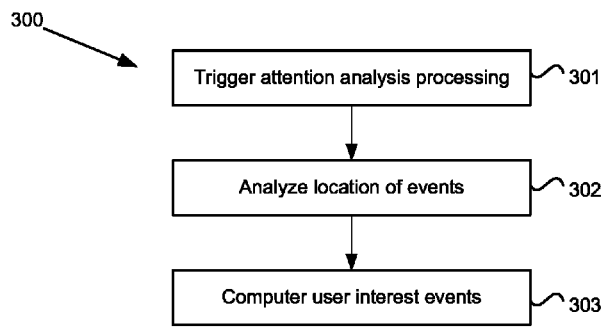
FIG. 6 illustrates an operation of an attention analysis module.

An operation 300 of the attention analysis module is shown in FIG. 6. At step 301, the attention analysis module 39 receives an analysis trigger, which might be a request, described in further detail below, or a timeout. The attention analysis module then analyzes the location of the events in the event stream messages relative to the DOM element location in the viewport in order to compute a probabilistic locus of attention for the user (step 302). In one embodiment, only the most recent event stream message may be analyzed, as this will include the most up to date information of the user's attention area. In one embodiment, the attention analysis module 39 computes the locus of attention from a plurality of mouse move events as these events can provide a fine grained indication of the user's focus in between mouse clicks. The locus of attention may be computed and stored as the user attention time per DOM element. In addition, the attention analysis module 39 may compute user interest events (step 303) such as hints, lingers, hovers, partial clicks, cancelled clicks, "on element exits" etc, any of which may assist in determining where a user's attention is directed. For example, a mousedown event followed by a mousemove may not register as a complete mouseclick, in particular if the mouseup event occurs off of a particular web page element. However, the mousedown, mousemove and mouseup events together may indicate a region of the user's interest or attention focus. In a further example, a mouse move followed by a brief period of time before the next mouse move may indicate a hover over a region of interest to the user.

By way of example, an event stream data excerpt of mousemove events, perhaps arriving in multiple event stream messages, may contain the following events in which the format is [x-position, y-position, time, DOM_element]: [100, 100, 0, div] [102, 101, 5, div] [104, 100, 10, div] [106, 99, 15, body] [110, 106, 18, div] [119, 115, 20, div] [121, 117, 28, span] [123, 115, 38, div] [126, 112, 45, div] [131, 108, 50, div] [135, 105, 55, div] [138, 99, 60, body] [140, 101, 65, div] [142, 102, 70, div]. The attention analysis of these events may result in a "linger" of the user's attention from time 0 to 70 on the <div> element's content. Analysis may also determine a "hint" of the user's attention from time 15 to 50 toward the <span> element with 20% probability with 80% probability that this hint is toward the <a id="link1"> element which is located below the <span> element. A key to the "hint" analysis is the increased rate of mouse movement (shorter time and more distance) along with the "v" shape of this segment of the mouse track. Note that an attention event, e.g. the "hint", may indicate the locus of attention of the user is on a DOM element that did not receive any client side user interface events (e.g. the <a id="link1"> element did not show up in our mousemove track).

The attention time and the user interest events may be computed for any DOM element or for DOM elements that have a particular identifier attribute within the page. This allows a web page designer to specify content areas for which to monitor user interest.

Figure 7:
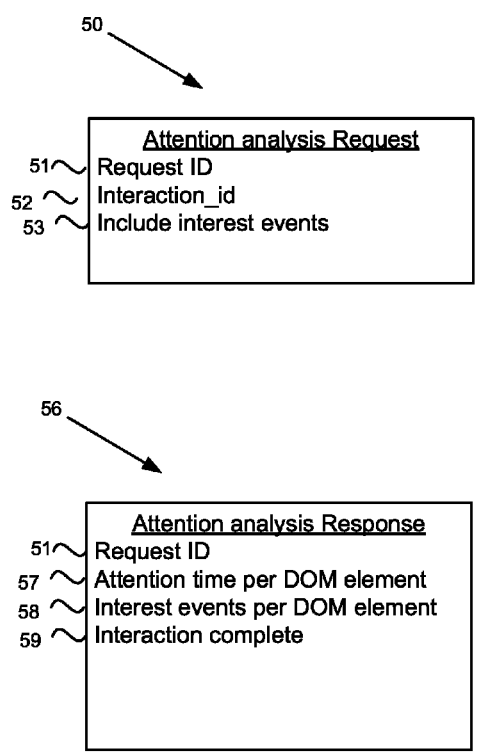
FIG. 7 illustrates an attention analysis request and response.

The attention analysis may be reported to the web server 14 automatically or in response to a request. With reference to FIG. 1, a request message 50 may be sent from a user interest processing module 19 of the web server 14 to the service provider module 17 of the event server 12. The request may be generated during the web page interaction with the client 18, for example at a time when an ad placement is required. A sample request 50 is shown in FIG. 7. The request includes a Request ID 51 and specifies an InteractionID 52 that identifies the interaction between the web server 14 and the client 18. The request 50 also specifies a Boolean value 53 as to whether interest events are to be included in the response. A response message 56 is also shown in FIG. 7. The response message indicates the same Request ID 51 as well as an attention time per DOM element 57. If the Boolean value of the request 53 was set to True, the response 56 will also include an interest events per DOM element value 58, which, in one embodiment, may comprise a list of DOM elements each having a sublist of interest event types and a counter which indicates the mid level interest events analyzed from the event stream such as hints, lingers, hovers, partial clicks, cancelled clicks and/or "on element" exits. The response message 56 can also include an "interaction complete" value 59 which is a Boolean value set to true if the event server 12 considers that the interaction pertaining to the InteractionID is complete, for example if no event stream message has been received by the event server 12 for a particular time, or if an event indicates that the web page has been closed.

Figure 8:
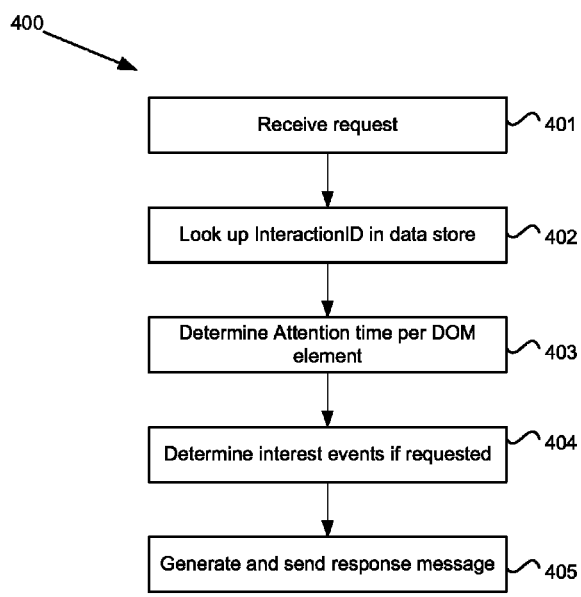
FIG. 8 illustrates an operation of a service provider module.

A process 400 of the service provider module 17 is depicted in FIG. 8. At step 401, the service provider module 17 receives the request 50 from the user interest processing module 19 of the web server 14. The service provider module 17 then extracts the InteractionID 52 from the request and looks up the InteractionID in the data store 28 (step 402). The attention time per DOM element is then retrieved or computed if new data has arrived or the value is not otherwise available (step 403). Based on the event stream data excerpt described above, the attention time could be as follows (format is a list of [element, time-on-element]): [[<div>, 52], [<body>, 9], [<span>, 9], [<a id="link1">, 0]]. The user's attention was analyzed based on the amount of time interface events were received on DOM elements (time from 0 to 70 has been assigned to DOM elements). If interest events have been requested, then these values can be retrieved from the InteractionID record in the data store 28 or otherwise computed (step 404). Analysis of the current example could result in the interest events as follows (format is a list of [element, interest-event-type, time-interval, probability]): [[<div>, linger, (0,70), 1.0], [<span>, hint, (15,50), 0.2], [<a id="link1">, hint, (15,50), 0.8]]. At step 405, a response message 56 is generated and provided from the service provider module 17 to the user interest processing module 19.

In an alternative embodiment, the event module 25 and attention analysis module 39 may be provided as components of the web server 14, such that all processing of the event streams, including determining the user's focus area, occurs within the web server 14

Figure 9:
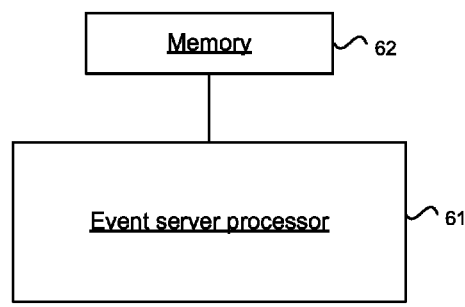
FIG. 9 illustrates a processor and memory of an event server.
Figure 10:
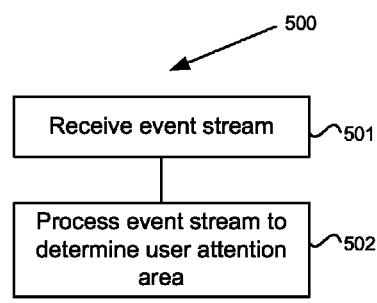
FIG. 10 illustrates an instruction set that may be executed on the processor and memory of FIG. 9.

In one embodiment, the event server 12 may include a processor 61 operatively associated with a memory 62 as shown in FIG. 9. The memory 62 may store instructions that are executable on the processor 61. In addition, the memory 62 may provide elements of the data store 28. An instruction set 500 that may be executed on the event server processor 61 is depicted in the flowchart of FIG. 10. Specifically, when executed, the instruction set 500 allows the processor to receive an event stream 501 from a web page interaction and process the event stream to determine an area of focus of a user during the interaction with the web page 502.

Figure 11:
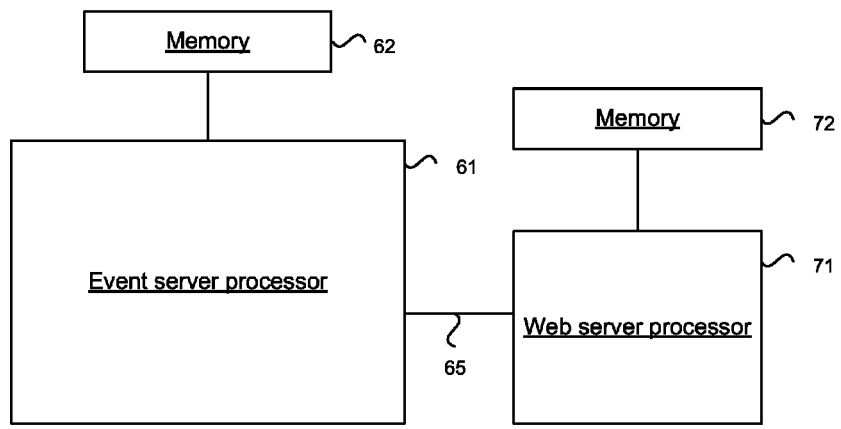
FIG. 11 illustrates the processor and memory of FIG. 9 in association with a processor and memory of a web server.

The analysis of the event stream may be performed in response to a request received from a second processor, such as processor 71 of a web server shown in FIG. 11, that may also be operatively associated with a memory 72. The second processor 71 may provide the interaction identifier through a suitable communications link 65 in a service request, such as the request 50 described above.

An advantage of the embodiments described above includes that the event data provides fine grained attention tracking which is hard to falsify by automated means.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for predicting an area of focus of a user during an interaction with a web page, the method comprising:
    recording at least one document object model element within a client web browser;
    recording, in the client web browser, a plurality of user interface events and recording at least one document object model element in which the respective user interface event occurred;
    generating, in the client web browser, at least one event stream message comprising an interaction identifier, the plurality of recorded user interface events and the recorded at least one document object model element;
    transmitting the at least one event stream message from the client web browser to an event server;
    receiving an attention analysis request in the event server, the attention analysis request indicating the interaction identifier; and
    in response to receiving the attention analysis request, processing the plurality of user interface events from the at least one event stream message associated with the interaction identifier at the event server to predict an area of focus of the user;
    wherein processing the plurality of user events comprises determining an attention time of a user per document object model element and wherein a result of the processing specifies at least one document object model element and the time spent on the respective document object model element.

2. The method according to claim 1 comprising generating a response to the request, wherein the response comprises an indication of an area of focus of the user.

3. The method according to claim 1 wherein processing the plurality of user interface events comprises processing a plurality of mouse move events.

4. The method according to claim 1 wherein processing the plurality of user events comprises determining at least one user interest event selected from a hint, linger, hover, partial click, cancelled click or on element exit.

5. A system comprising:
    an event server;
    a web server configured to:
    generate a web page comprising:
        web page content visible to a user;
        an event observer module that, when executed in a client browser, records an interaction identifier and user events generated in respect of the webpage content and communicates event stream data comprising the user events and the interaction identifier from the client browser to the event server, the user events comprising an indicator of an element of a Document Object Model of the web page; and
    a layout module that augments the event stream data with page layout data; and
    provide the web page to the client browser;
    wherein the event server is configured to receive an attention analysis request from the web server comprising the interaction identifier and in response to receiving the attention analysis request, process the plurality of user events from the event stream data pertaining to the interaction identifier to predict an area of focus of the user; and
    wherein the event server is configured to generate a list of attention time per Document Object Model element of the web page and wherein a result of the processing by the event server specifies at least one document object model element and the time spent on the respective document object model element.

6. The system according to claim 5 wherein the layout module is generated to augment the event stream data with data relating to one or more elements of a document object model of the web page.

7. The system according to claim 6 wherein the layout module is generated to augment the event stream data with data relating to at least one of document object model location changes and document object model structure changes.

8. The system according to claim 5 wherein the event observer module is generated to generate at least one event stream message comprising a plurality of events and a viewport location of each of the plurality of events.

9. The system according to claim 5 wherein the event observer module is generated to record a plurality of mouse move events.

10. The system according to claim 5 comprising the event server, wherein the event server is configured to process the plurality of user events to predict an area of focus of the user.

11. A non-transitory computer-readable medium comprising computer-executable instructions for execution by a processor, that, when executed, cause the processor to:
    receive an event stream from a client browser, the event stream comprising an interaction identifier and a plurality of events generated in the client browser during a user interaction with a web page, the events comprising an indicator of an element of a Document Object Model of the web page;
    receiving an attention analysis request in the event server, the attention analysis request indicating the interaction identifier; and
    in response to receiving the attention analysis request, retrieve user attention analysis data in respect of the interaction identifier; and
    process the retrieved user attention analysis data to determine an attention time of a user per document object model element of the webpage and
    process the event stream to determine, using the attention time of a user per document object model element of the webpage, an area of focus of a user during the user interaction with the web page, wherein a result of the processing specifies at least one document object model element and the time spent on the respective document object model element.

12. The non-transitory computer-readable medium according to claim 11 comprising instructions, that when executed by the processor, cause the processor to determine an area of focus of a user from a plurality of mouse move events.

* * * * *